United States Patent [19]

Linczmajer

[11] 4,198,019

[45] Apr. 15, 1980

[54] FLEXIBLE AIRFRAME FLYING WING

[76] Inventor: Janos J. Linczmajer, c/o J. B. Elliott, 46 Perry St., New York, N.Y. 10014

[21] Appl. No.: 893,705

[22] Filed: Apr. 5, 1978

[30] Foreign Application Priority Data

Oct. 18, 1977 [BE] Belgium ............................ 181827

[51] Int. Cl.² ............................ B64C 3/14; B64C 3/22
[52] U.S. Cl. ................................ 244/123; 244/153 R; 244/DIG. 1
[58] Field of Search ............... 244/123, 16, DIG. 1, 244/153 R, 154, 45 R, 219; 114/103

[56] References Cited

U.S. PATENT DOCUMENTS

| | | | |
|---|---|---|---|
| 1,220,374 | 3/1917 | Stupar | 244/219 |
| 1,690,362 | 11/1928 | DeWitt | 244/153 R |
| 3,749,338 | 7/1973 | Kinsey | 244/153 R |

FOREIGN PATENT DOCUMENTS 315341 11/1919 Fed. Rep. of Germany .... 244/DIG. 1
2309400 12/1976 France ............................ 244/DIG. 1

*Primary Examiner*—Barry L. Kelmachter
*Attorney, Agent, or Firm*—Anthony J. Casella; Michael A. Stallman

[57] ABSTRACT

A flexible airframe flying wing, such as used for hang gliding, includes a central rib to which is perpendicularly connected two flexible spars. In turn, a plurality of floating ribs are releasably connected to the flexible spars, and extend generally parallel to the central rib. A flexible membrane envelops the central rib, the floating ribs, and the flexible spars in such manner as to bias the flexible spars in an arcuate configuration to define the leading edge of the flying wing. By virtue of the components thereof, and the flexible interconnection therebetween, the resulting flexible airframe flying wing is autostable and will adapt itself a various flight attitudes and conditions.

5 Claims, 3 Drawing Figures

FLEXIBLE AIRFRAME FLYING WING

The object of the present invention is to provide a flying wing composed of a central rib in "S" shape connected to flexible spars forming a "V", the ends of which are flexed aft and retained in an envelope of a flexible membrane adapted to house the "S" shaped floating ribs in its back side.

Another object of the present invention is to provide a flexible airframe flying wing which is distinguishable from other known flying wings by its flexible and light structure, and capable of absorbing dynamic loads, yet retaining autostability, excellent aerodynamic features, control, and the capability of being disassembled to several pieces.

Further objects and advantages of the invention will become apparent from a reading of the following detailed description taken in conjunction with the drawings in which.

Figure 1:
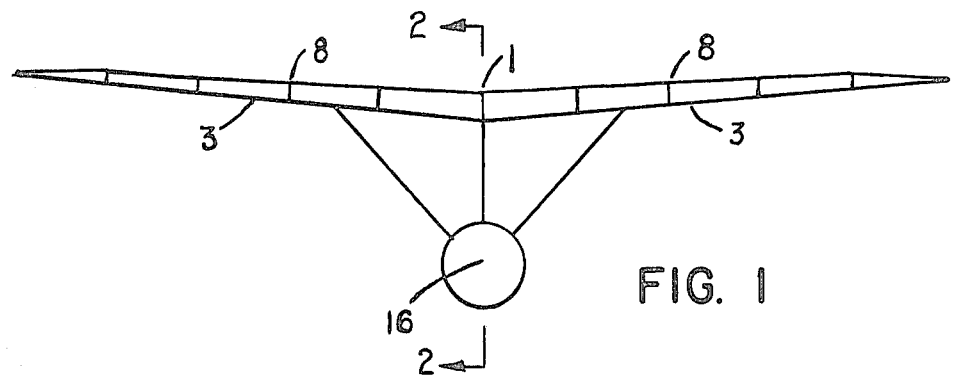
FIG. 1 is a frontal view of the flexible airframe flying wing of the subject invention.

Referring to the figures, the flexible airframe flying wing of the subject invention consists of a central, rigid, non-deformable rib 1 in the form of a reflex profile, the front end of which is provided with sockets 2 in which are housed, in a "V" shape socket viewed from the front, flexible spars 3 which form the leading edge of the flexible airframe flying wing.

The spars 3 are flexed aft, up to the straight center of pressure line of the wing, designated by the numeral 4, by their rounded ends 5 that are housed in the pockets 6 provided to retain same in the two-sided flexible membrane cover 7 enveloping the entire airframe of the flying wing. The flexible membrane cover 7 is provided with a top side 12 and a bottom side 15.

Figure 2:
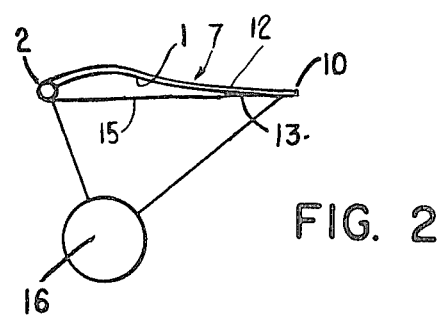
FIG. 2 is a sectional view of the subject invention taken along line 2—2 in FIG. 1.
Figure 3:
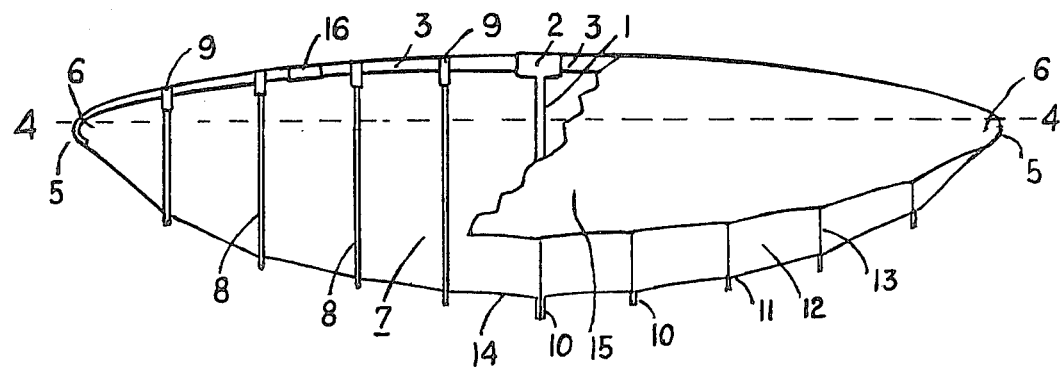
FIG. 3 is the plan view of the flexible airframe flying wing of the subject invention.

A plurality of rigid non-deformable floating ribs 8, (see FIG. 3) each having the "S" shape of a reflex profile, and flexibly connected to the spars 3, via sockets 9. The back edge of the top side 12 of the flexible membrane cover 7 is connected to the rear ends of both the central rib 1 and the floating ribs 8. The back edge of the bottom side 15 of the cover 7 is connected to the rear ends of both the central rib 1 and the floating ribs 8, via elastic cables or members 13. By this arrangement, the back edge of the top side 12 of the cover 8 constitutes the trailing edge 14 of the flexible airframe flying wing. The back edge of the bottom side 15 of the cover 7 is pressed against the lower surface of the top side 12 of the cover 7 by air pressure during flight of the flexible airframe flying wing. A payload 16 may be attached to the spars 3 and to the central rib 1, as shown in FIGS. 1 and 2.

By virtue of the flexible quality of its structure, the flexible airframe flying wing of the subject invention absorbs the dynamic flight loads. In a glide, the total weight is in equilibrium with the aerodynamic lift acting on the cover 7 held in shape by the flexible structure which, as a function of the total weight, is subject to some deformation in the form of a "V" (see FIG. 1) and in torsion towards the wing tips.

In a straight flight or in a turn under calm conditions, the deformation is stabilized. In an up gust, the momentarily increased gravity forces are absorbed on the one hand by the flexing of the spars 3, and on the other hand, by the floating ribs 8. The latter, by pivoting upwardly, will increase the torsion and thereby decrease the angle of attack towards the wing tips 5, thus diminishing the lift.

The flying wing will remain autostable in all three axes, in spite of the continuous flexing of its structure under dynamic flight loads. In pitch, it is by virtue of the S-shaped autostable profile that the center of pressure 4 forms a straight line that coincides with the axes of the wing torsion. It is noted that longitudinal stability is achieved with a reflex profile, and positive pitching moment of same is held in balance by the center of gravity placed in front of the center of pressure of the flexible airframe flying wing, and will not be affected by changing washout as it will occur along the straight center of pressure axis of the wing. The center of pressure axis, as indicated above, is designated by the numeral 4. In yaw, it is by virtue of the vertical surfaces projected by the "V" setting of the wing that directional stability is achieved. In roll, autostability is achieved by virtue of the stabilizing effect of the "V" setting of the subject flexible airframe flying wing.

The flexible airframe flying wing will advantageously adapt itself to different flight conditions:

1. At high speeds, (e.g., in a dive without a motor, or with a motor at level flight), the torsion of the wing will diminish by the increased aerodynamic down pressure on the reflex trailing edge. Thus, the glide angle or fineness ratio (Lift/Drag ratio) of the wing is increased.

2. In flight at large angles of attack, the wing tips will fly at a lower angle of attack than the central portion since the aerodynamic down pressure on the reflex trailing edge is diminished. Thus, the wing tips will stall last.

3. In case the gravitational forces acting on the flexible airframe flying wing become momentarily increased, for example, by a sudden up gust, the torsion of the wing will increase towards the tips. Accordingly, the lift towards the tips will shift forward and, by becoming a propulsive force, the wing will accelerate.

The flying wing of the subject invention may be controlled by the displacement of the center of gravity. The longitudinal displacement of the center of gravity to the front, for example, will make the flexible airframe flying wing dive. The lateral displacement of the center of gravity will engage the wing in a turn.

To disassemble the flexible airframe flying wing of the subject invention, the tension of the cover 7 is relieved by first untying the elastic cables 13 at the back edge of the bottom side 15 of the cover 7, disconnecting the back edge of the top side 12 of the cover 7 and, then flexing the spars 3 to the aft by a cord and multiple-pulling device (not shown). This will enable the spar ends 5 to be dislodged from the pockets 6 in the cover 7, and thus relax the spars 3. The floating ribs 8 may be disconnected from the sockets 9 on the spars 3, after which the spars 3 may be disconnected from the sockets 2 on the end of the central rib 1. The payload 16 may also be disconnected from the spars 3 and the central rib 1.

Although the invention has been described with respect to a single embodiment thereof, it is readily apparent that alterations and modifications therein may by made without departing from the spirit and scope of the invention as defined by the appended claims.

What is claimed is:

1. A flexible air frame flying wing having a substantially straight line center of pressure, comprising a rigid, non-deformable central rib, flexible spars connected to said central rib and disposed perpendicular thereto, a plurality of rigid, non-deformable floating ribs connected to said flexible spars, said central rib and floating ribs having an "S" shape of an autostable reflex profile, a flexible membrane, having top and bottom sides, enveloping said central rib, said floating ribs, and said flexible spars with the back edge of the top side of said flexible membrane being connected to the back ends of the central rib and the floating ribs, and with elastic cables connecting the back edge of the bottom side of the flexing membrane with the back ends of the central rib and the floating ribs in such manner as to bias the flexible spars in an arcuate configuration whereby the ends of the flexible spars are flexed aft up to the straight line corresponding to the center of pressure of the wing.

2. The flexible airframe flying wing according to claim 1 wherein the flexible spars are mounted in a "V" form portion of the central rib, as viewed from the front of said flying wing.

3. The flexible airframe flying wing according to claim 1 wherein the front ends of the floating ribs are disposed in sockets flexibly mounted on the flexible spars.

4. The flexible airframe flying wing according to claim 1 wherein a payload is attached to the central rib and to the flexible spars.

5. The flexible air frame flying wing according to claim 1 wherein said central ribs, flexible spars, floating ribs and flexible membrane may be disassembled.

* * * * *